USO05355183A

United States Patent [19]

Andrea

[11] Patent Number: 5,355,183
[45] Date of Patent: Oct. 11, 1994

[54] SEALED ADJUSTABLE POLARIZED SUNGLASSES

[75] Inventor: Douglas Andrea, Old Brookville, N.Y.

[73] Assignee: Andrea Eyewear, Inc., Long Island City, N.Y.

[21] Appl. No.: 953,890

[22] Filed: Sep. 30, 1992

[51] Int. Cl.⁵ .............................................. G02C 7/12
[52] U.S. Cl. ...................................... 351/49; 351/84; 351/135
[58] Field of Search ................ 351/43, 47, 49, 60, 351/84, 85, 107, 116, 133, 135, 148

[56] References Cited

U.S. PATENT DOCUMENTS

| 2,251,330 | 11/1939 | Fairbank. |
| 2,298,058 | 6/1941 | Land. |
| 2,380,481 | 2/1941 | Tillyer et al. . |
| 2,565,362 | 12/1948 | Eloranta. |
| 2,688,900 | 2/1951 | Silverman. |
| 2,773,422 | 11/1953 | Flynn, Sr. et al. . |
| 3,371,979 | 3/1968 | Catanzaro ............................ 351/49 |
| 3,838,913 | 10/1974 | Schwarz .............................. 351/47 |
| 3,944,346 | 3/1976 | Shindler .............................. 351/49 |
| 4,113,364 | 9/1978 | Dussich ............................... 351/49 |
| 4,119,369 | 10/1978 | Eloranta et al. ..................... 351/49 |
| 4,149,780 | 4/1979 | Young ................................. 351/49 |
| 4,264,154 | 5/1981 | Petersen ............................. 351/49 |
| 4,386,832 | 6/1983 | Nannini ............................... 351/49 |
| 4,595,262 | 6/1986 | Ogle .................................... 351/49 |
| 4,943,152 | 7/1990 | Whelen ............................... 351/49 |

FOREIGN PATENT DOCUMENTS 2210176 6/1989 United Kingdom ................ 351/138

OTHER PUBLICATIONS

Polaroid, "Linear and Circular Polarizers To eliminate glare and enhance contrast for a variety of application . . . in all industries", May 1992.

Primary Examiner—Richard A. Bertsch
Assistant Examiner—Alfred Basichas
Attorney, Agent, or Firm—Thomas J. Kowalski

[57] ABSTRACT

Disclosed and claimed are a substantially hermetically sealed variable density ophthalmic device, preferably in the form of sunglasses or goggles. The device includes front and rear frame components which matingly fit and seal together. The polarized or retarder lenses include at least one pair of rotatable lenses. These lenses are preferably rotatable by a flexible strip having a knob. A grommet or boot or the combination thereof seals the interface where the strip enters a frame component.

19 Claims, 8 Drawing Sheets

SEALED ADJUSTABLE POLARIZED SUNGLASSES

FIELD OF THE INVENTION

This invention relates to an adjustable or variable density polarized ophthalmic device such as sunglasses. That is, an ophthalmic device such as sunglasses of the type having a frame provided with a bridge portion connecting right and left frame sections each supporting at least one rotatable polarizing lense or at least two polarizing lenses which are rotatable relative to one another (or wherein at least one is rotatable relative to the other) to vary the intensity of the light transmitted to the wearer (and accordingly the color of the lenses). Preferably the sunglasses have rearwardly extending temple pieces; however, temple pieces are not necessarily required, as an elastic strap or other suitable means can be employed to set the ophthalmic device of the invention on the wearer's head. Thus, the invention also relates to variable density goggles such as ski goggles. More particularly, this invention relates to such an ophthalmic device, e.g., sunglasses, which are substantially hermetically sealed. Further, the invention relates to such substantially hermetically sealed sunglasses which are preferably substantially buoyant and/or substantially anti-fog.

BACKGROUND OF THE INVENTION

Reference is made to the following documents which are hereby incorporated herein by reference:

U.S. Pat. No. 2,251,330 - Fairbank
U.S. Pat. No. 2,298,058 - Land
U.S. Pat. No. 2,380,481 - Tillyer
U.S. Pat. No. 2,565,362 - Eloranta
U.S. Pat. No. 2,688,900 - Silverman
U.S. Pat. No. 2,773,442 - Flynn et al.
U.S. Pat. No. 3,838,913 - Schwarz
U.S. Pat. No. 3,944,346 - Shindler
U.S. Pat. No. 4,119,369 - Eloranta
U.S. Pat. No. 4,264,154 - Petersen
U.S. Pat. No. 4,386,832 - Nannini
U.S. Pat. No. 4,595,262 - Ogle
U.S. Pat. No. 4,943,152 - Whelen
Polaroid, "Linear and Circular Polarizers To eliminate glare and enhance contrast for a variety of application . . . . in all industries"

The above-referenced patents illustrate a variety ophthalmic devices. For instance, Petersen, Eloranta (4,119,369), Eloranta (2,565,362), Tillyer, Fairbanks and Land are illustrative of sunglasses employing two overlying polarizers, one of which is rotatable relative to the other. The Eloranta, Tillyer, Fairbanks and Land patents illustrate such sunglasses wherein the user manually adjusts the rotational position of the movable polarizer; Petersen employs an electromagnetic acutater to rotate a polarizing element. The Polaroid brochure provides various commercially available sheet polarizers which are useful in the practice of this invention.

Sunglasses or goggles of the type having a frame provided with a bridge portion connecting right and left frame sections each supporting at least two polarizing lenses which are rotatable relative to one another (or wherein at least one is rotatable relative to another) to vary the intensity of the light transmitted to the wearer, and accordingly the color of the lenses, have several uses. Certainly it is desired to be able to vary the tint of sunglasses or goggles as the day progresses from moderate early morning light to the bright light of midday and then to moderate light as evening approaches.

For instance, the fisherman, sport or professional, begins his day before the sun has even risen and toils for his catch from early morning, when the sunlight is moderate, through midday when the sun is at its strongest. As the daylight differs, the fisherman may desire a different contrast during the day, especially against the water. Typical sunglasses may be too darkly tinted for the early morning; lightly tinted sunglasses may be too light for the midday sunlight. Thus, variable density sunglasses to meet the needs of the fisherman.

Consider further those who enjoy snow-skiing. Early in the day it may be best to have sunglasses or goggles of one tint for best contrast, e.g., to ski using a pinkish tint, but, later in the day, when the sun is strongly reflecting off the snow, it maybe best to have sunglasses or goggles of a different tint, e.g., to ski using a bluish tint, so as to then obtain the best contrast. Further, in the winter, the afternoon is shorter, with sunset occurring earlier in the day, such that a different tint may be desired towards the end of the day. Thus, variable density sunglasses or goggles to meet the skier's needs. However, when considering that snow-skiing is undertaken at such places as Aspen, Vail and other spots in Colorado, Lake Tahoe, Mont Treblanc, Quebec, Canada, the Alps, etc., for the skier, the variable density sunglasses or goggles should also be fashionable.

In addition, there are those who recreate on a beach. That is, consider the beach-goer. Not only does the sun vary from morning to sunset; but, there are those who sunbathe to watch their fellow sunbathers, as well as "be seen". For these folks variable density sunglasses are not only for meeting the need of the varying intensity of the sun during the course of the day; but also, for the purpose of making a fashion statement.

Likewise, consider simply a typical person who wears sunglasses on a typical day. In the morning he may wish one tint to simply reduce the glare of a mild morning sun; perhaps a darker tint at lunchtime when the sun is stronger; and, maybe a different tint as evening sets in, when this person is traveling or out in public for a social event.

Indeed, in this era of a depleted ozone layer, the need for shielding the eyes from UV light is rather important. In particular, excess short term ultraviolet light can cause photokeratitis, which is like a sunburned cornea. Long term excess ultraviolet light can contribute to cataracts or increase the risk of long term damage the central part of the retina. Thus, when the sun is at its strongest a person may desire yellow, orange, amber or a brown-tinted sunglasses, which can block out blue light, the next wavelength up from UV. Blue light contains more energy than the rest of the visible spectrum and can do damage akin to UV.

Sunglasses or goggles which change from light to dark automatically do not meet the needs of these individuals because they are typically slow to react, and do not adjust to the colors desired. Thus, in this era of automation, manually adjustable sunglasses or goggles may be desired; but this invention could include automated variable density sunglasses and is not necessarily limited to manually adjustable sunglasses.

Moreover, each of the above-mentioned individuals have further needs with respect to variable density sunglasses or goggles. As to the fisherman and beach-goer, the variable density sunglasses need to be substantially buoyant. For instance, in reeling in the "big-catch" or jumping for the Frisbee near the shoreline, sunglasses may fall off. If not substantially buoyant, the sunglasses may become Neptune's prize. Sunglasses can be rather expensive such that to lose them to the bottom of the sea can be a substantial loss. And, at the beach or, when fishing, the sunglasses may encounter water and the internal rotatable lenses should be substantially immune to this potential encounter.

As to the skier, the temperature gradient between the skier's skin or breath and the air can cause the sunglasses or goggles to fog. Thus, the sunglasses or goggles should preferably be substantially anti-fog. Further, the internal rotatable lenses, for the skier's use must be substantially immune to the potential of the glasses or goggles encountering snow.

And, for each of these wearers, including the typical person, if sunglasses containing more than one pair of lenses are to be commonly, fashionably worn, they must not only be attractive, but also be as easy to care for as sunglasses or goggles having one pair of lenses.

Thus, the adjustable or variable density sunglasses for each of these individuals needs to be substantially waterproof. For instance, to avoid the need of having to clean the interior polarized lenses. For example, to avoid the need of having to remove moisture, snow, dust, dirt, sand, salt or other particulate matter from the interior polarized lenses as well as to prevent corrosion of the polarized lenses.

None of the above-referenced patents teaches or suggests sealing the interior polarized lenses between a front frame component and a rear frame component so that the sunglasses or goggles are substantially waterproof, and/or substantially dust-proof, and/or substantially buoyant, and/or substantially anti-fog. Nor do these patents teach or suggest such sunglasses or goggles which may be fashionably worn.

Indeed, the teaching of these patents tends toward sunglasses or goggles which are not sealed, so that they can be disassembled for cleaning, i.e., the patents teach away from permanently substantially sealing (e.g., by sonic welding and glueing) the polarized lenses between front and rear frame components because such would not allow for easy disassembly. The problem of keeping the polarized lenses clean was dealt with by disassembly, and not by sealing the polarized lenses between front and rear frame components. Further, the goggles of the above-mentioned patents tend toward those which are for special purposes, and not for fashionable wear, e.g. skiwear. In addition, the present invention involves and exploits biorefringence, an effect which the sunglasses industry has avoided since the advent of polarized material.

Thus, heretofore a substantially hermetically sealed variable density ophthalmic device, e.g. sunglasses or goggles of the type having a frame provided with a bridge portion connecting right and left frame sections each supporting at least one rotatable polarizing lense or at least two rotatable polarizing lenses which are rotatable relative to one another or wherein at least one is rotatable relative to the other, have not been taught or suggested. Likewise, heretofore such hermetically sealed sunglasses or goggles which are substantially liquid-proof and/or substantially buoyant and/or substantially anti-fog have not been known or suggested.

OBJECTS AND SUMMARY OF THE INVENTION

It is therefore an object of the invention to provide a substantially hermetically sealed adjustable or variable density polarized ophthalmic device, such as sunglasses or goggles.

It is an object to provide an adjustable or variable density ophthalmic device which is an improvement over prior devices of this nature.

It is also an object of the invention to provide a substantially hermetically sealed adjustable or variable density polarized ophthalmic device, e.g., sunglasses or goggles which are substantially liquid-proof, e.g., water-proof.

It is a further object of the invention to provide a substantially hermetically sealed adjustable or variable density polarized ophthalmic device, e.g., sunglasses or goggles, which are substantially buoyant.

It is an additional object of the invention to provide a substantially hermetically sealed adjustable or variable density polarized ophthalmic device, e.g., sunglasses or goggles, which are substantially anti-fog.

It is yet another object of the invention to provide a substantially hermetically sealed adjustable or variable density polarized ophthalmic device, e.g., sunglasses or goggles, which are substantially dust-proof.

It is yet a further object of the invention to provide a substantially hermetically sealed adjustable or variable density polarized ophthalmic device, e.g., sunglasses or goggles, which are liquid-proof and buoyant and/or anti-fog.

It is additionally an object of the invention to provide a substantially hermetically sealed adjustable or variable density polarized ophthalmic device, e.g., sunglasses or goggles, which do not require disassembly for cleaning the interior polarized lenses.

Furthermore it is an object of the invention to provide the aforementioned ophthalmic device, e.g., sunglasses or goggles, in fashionable styles. It is also an object of the invention to provide a fashionably styled variable density ophthalmic device, e.g., sunglasses or goggles, which lend themselves to being worn when fashion is a consideration. And, fashionable styles can include not only the aesthetic of the nonfunctional elements of the ophthalmic device, e.g., sunglasses or goggles, but also that the wearer can adjust the color of the lenses to desired fashionable colors.

Therefore, the present invention provides a variable density ophthalmic device comprising:

a frame provided with a bridge portion connecting right and left frame sections each supporting at least one rotatable polarizing lense, said frame further comprising:

a front frame component having a bridge portion connecting right and left sections each supporting the rotatable polarizing lense;

means defining an opening at the right and left sections of the front frame component;

a thin strip of flexible material slidably extending laterally across a top portion of the front frame component, the length of said strip being greater than the distance between the axes of said rotatable lenses, and said strip having a first end and a second end, said first end passing through one opening of the front frame component and being connected to one rotatable polarizing lense, and said second end passing through the other opening of the front frame component and being connected to the other rotatable polarizing lense;

an operating knob protruding from said strip for movement of said strip so as to simultaneously adjust the angular position of both of the rotatable lenses;

means to substantially hermetically seal the opening at the right and left sections of the front frame component and that portion thereof through which the strip passes through; and a rear frame component having a bridge portion connecting right and left sections, said rear frame matingly fitting and substantially hermetically sealed to said front frame component;

so that by said sealing means and said rear frame component being substantially hermetically sealed to said front frame component, said variable density ophthalmic device is substantially sealed and substantially liquid-proof.

The present invention also provides a variable density ophthalmic device comprising:

a frame provided with a bridge portion connecting right and left frame sections each supporting at least one rotatable polarizing lense, said frame further comprising:

a rear frame component having a bridge portion connecting right and left sections each supporting the rotatable polarizing lense;

means defining an opening at the right and left sections of the rear frame component;

a thin strip of flexible material slidably extending laterally across a top portion of the rear frame component, the length of said strip being greater than the distance between the axes of said rotatable lenses, and said strip having a first end and a second end said first end passing through one opening of the rear frame component an being connected to one rotatable polarizing lense, and said second end passing through the other opening of the rear frame component and being connected to the other rotatable polarizing lense;

an operating knob protruding from said strip for movement of said strip so as to simultaneously adjust the angular position of both of the rotatable lenses;

means to substantially hermetically seal the opening at the right and left sections of the rear frame component and that portion thereof through which the strip passes through; and a front frame component having a bridge portion connecting right and left sections, said front frame component matingly fitting and substantially hermetically sealed to said rear frame component;

so that by said sealing means and said front frame component being substantially hermetically sealed to said rear frame component, said variable density ophthalmic device is substantially sealed and substantially liquid-proof.

The invention also provides the ornamental design for a variable density ophthalmic device.

In preferred embodiments the means to substantially hermetically seal the opening comprises a gasket fitting in each opening of the front frame component, said gasket preferably having a means defining an opening of a first diameter, and said strip preferably having a second diameter slightly larger than said first diameter.

Alternatively, the means to substantially hermetically seal the opening comprises a flexible sheath fitting in each opening of the front frame component, said sheath having a first end, a second end, length and a means defining an opening of preferably a first diameter at said first and second end, said strip preferably having a second diameter slightly larger than the first diameter, and said length extending from said opening to bout said knob.

In other embodiments the means to substantially seal the opening comprises a flexible sheath fitting in each opening of the front frame component, secured therein by the gasket, said sheath extending from each opening over the knob.

In certain embodiments there are at least two polarizing lenses, with one of the lenses being fixed and the other being rotatable.

In the ophthalmic device the rear frame component can include a polarizing lense in each of the right and left sections, especially when the rotatable lenses are in the front frame component. Likewise, the front frame component can include a fixed polarizing lense in each of the right and left sections, especially when the rotatable lenses are in the front frame component. Further, the rear frame component can include a polarizing lense in each of the right and left sections and the front frame component includes a fixed polarizing lense in each of the right and left sections; again, especially when the rotatable lenses are in the front frame component.

The front and rear frame components can be sealed under a controlled atmosphere so that the ophthalmic device is substantially anti-fog. In preferred embodiments the ophthalmic device is substantially buoyant. The front and rear frame components can be formed from a plastic such as polycarbonate; and, they can be sealed together by an adhesive, or, preferably by sonic welding. The strip can be formed from polytetrafluoroethylene or polymers or copolymers thereof, such as Teflon. The lenses can be created so as to provide UV protection or absorption.

The ophthalmic device can further comprise rearwardly extending temple pieces from the frame so that the device is sunglasses. Alternatively, the ophthalmic device can further comprise at least one rearwardly extending strip from the frame so that the device is goggles, such as ski goggles.

In addition, the ophthalmic device can further comprise a guide seat on the bridge portion upon which the strip rides.

Further, rather than using a strip connecting the rotatable lenses, a sealed gear mechanism can be employed instead so that the user can move the rotatable lenses.

These and other embodiments and obvious variations thereof are disclosed in are apparent from the following detailed description.

BRIEF DESCRIPTION OF THE DRAWINGS

A better understanding of the invention will be had by reference to the accompanying Figures, expressly incorporated herein by reference, wherein.

DETAILED DESCRIPTION

In this detailed description, reference is to all of the Figures, as well as those particularly mentioned.

Figure 3:
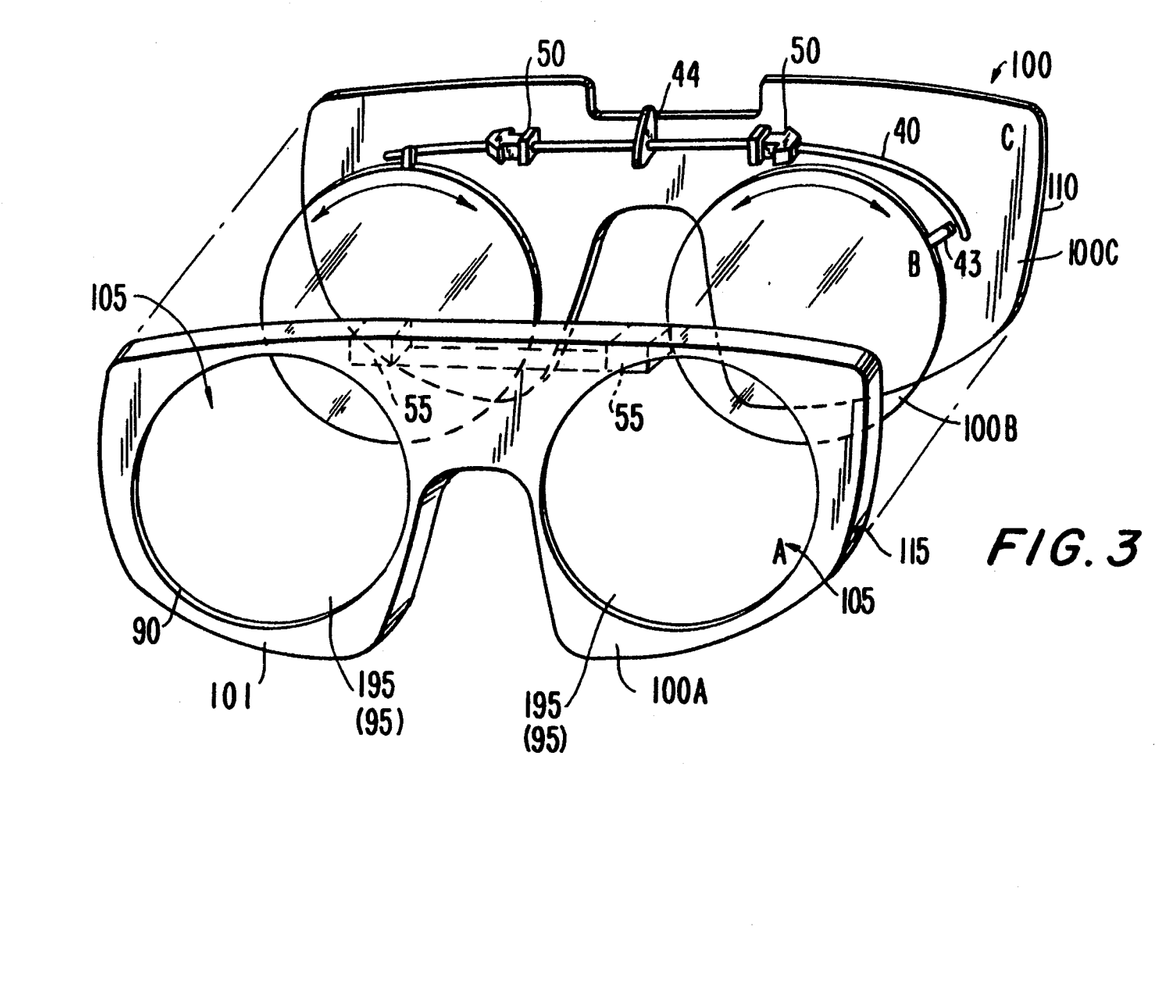
FIGS. 3 and 3A show exploded views of variable density ophthalmic devices of the invention.
Figure 3A:
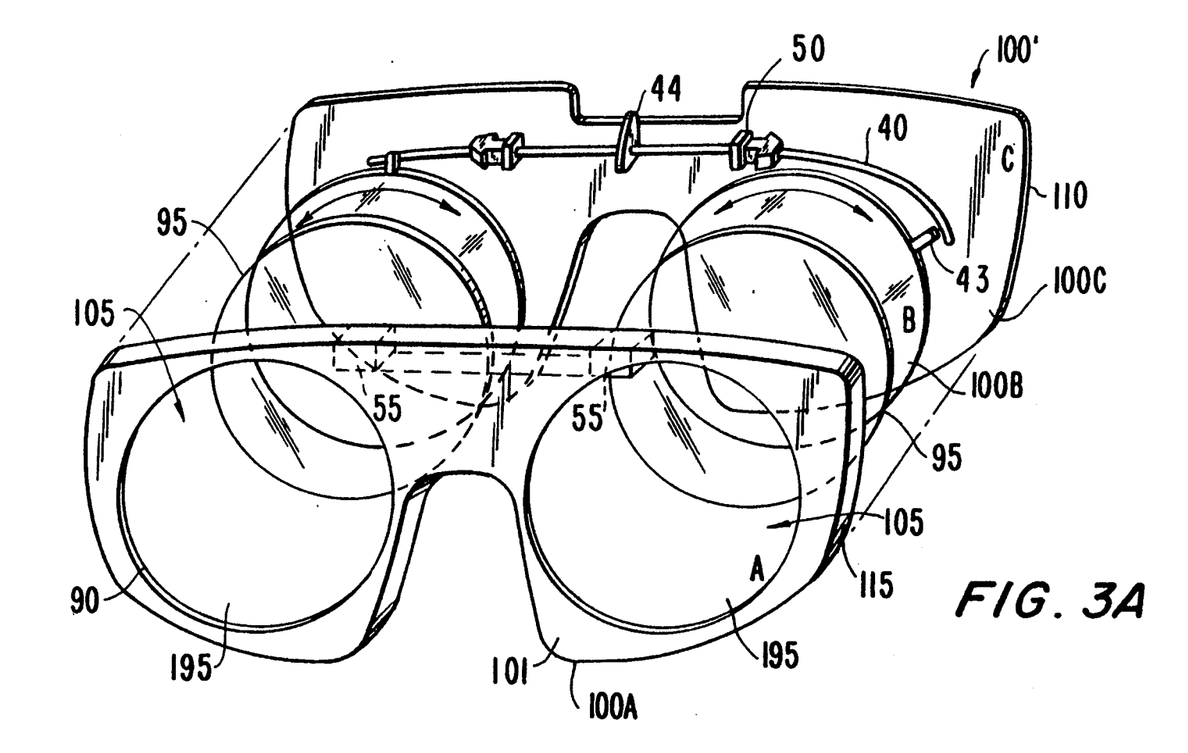

Referring initially to FIGS. 3 and 3A, each an exploded view of a preferred embodiment of the ophthalmic device of the invention, depicted is that which shall hereinafter, without limitation intended, be called sunglasses 100 and 100', respectively. That is, it is to be understood that the mechanism and design of sunglasses 100 and 100' can be implemented in other ophthalmic devices, e.g., goggles (e.g., goggles 100", FIG. 4), and such is comprehended within the scope of the invention. In FIGS. 3 and 3A there is shown front frame component 100A, lenses 100B, rear frame component 100C, grommets 50, grommet receiving means 55, nib 43, cable 40 and knob 44. Front frame component 100A contains lenses 100B, as well as cable 40, grommets 50 and grommet receiving means 43. Rear frame component 100C is sealed to front frame component 100A. Cable 40, grommets 50 and grommet receiving means 55 are located at the top of sunglasses 100 or 100' proximate the bridge of the sunglasses. Each nib 43 is located on the periphery of each of lenses 100B and contacts cable 40; and, knob 44 is located on cable 40.

As shown in FIGS. 1A, 1B, 1C, 2A, 2B, 2F, 2G, 2H, 3 and 3A, front frame component 100A preferably has track 90 at the top thereof or proximate the bridge of the sunglasses and continuing around the sides of the sunglasses. Within track 90 lenses 100B and cable 40 ride. Cable 40, near each end thereof, has cut-outs 42 within which fit nibs 43 of lenses 100B. Track 90 runs around a circumference for lenses 100B, and, continues towards the bridge to grommet receiving means 55. Cable 40 passes through grommets 50 via holes 52. Grommets 50 fit in front frame component 100A at grommet receiving means 55, with each grommet 50 and grommet receiving means 55 being located at the top of sunglasses 100 or 100' on each side of the bridge. Accordingly, cable 40 from one end to the other runs within track 90 from one nib 43 to one grommet 50 across or over the bridge to the other grommet 50 to the other nib 43. Thus, preferably front frame component 100A contains the rotatable polarizing lenses 100B. Rear frame component 100C is affixed to front frame component 100A so that by means of grommets 50 and the seal between frame components 100A and 100C, lenses 100B are substantially hermetically sealed within and between frame components 100A and 100C.

With respect to the seal 113 between frame components 100A and 100C, outer perimeter 110 of rear frame component 100C preferably matingly fits within front frame component 100A, containing and sealed to inner perimeter surface 115 of front frame component 100A; see also FIGS. 1A, 1B, 2A, 2B.

Figure 1A:
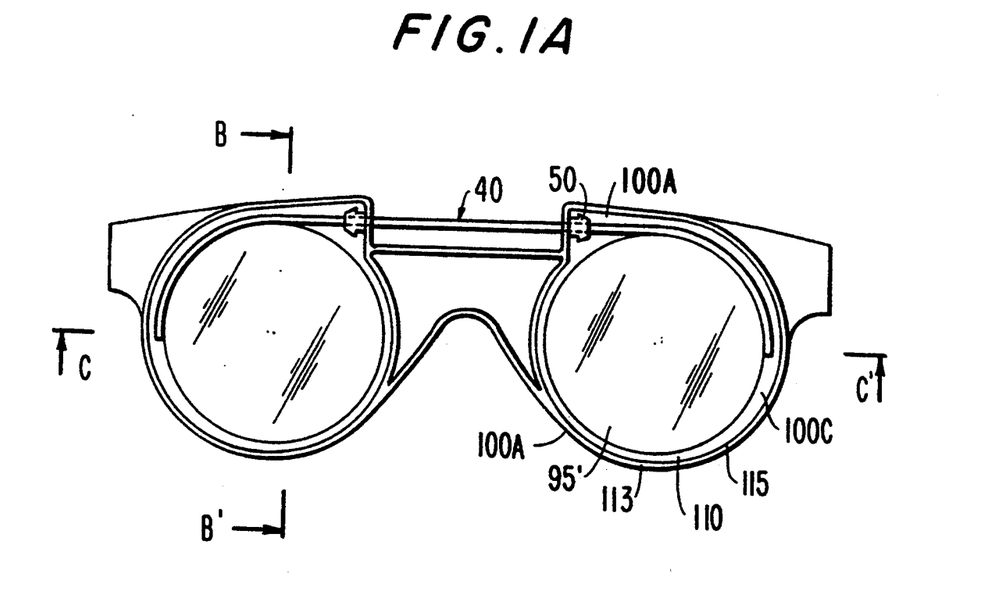
FIG. 1A shows a rear view of an embodiment of a variable density ophthalmic device of the invention.
Figure 1B:
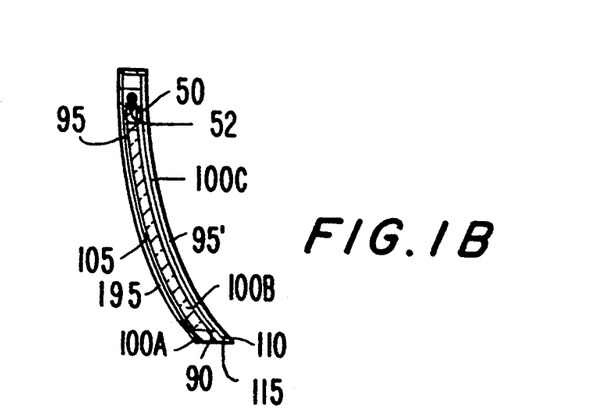
FIG. 1B shows a cross-section along line B—B' of FIG. 1A.
Figure 1C:
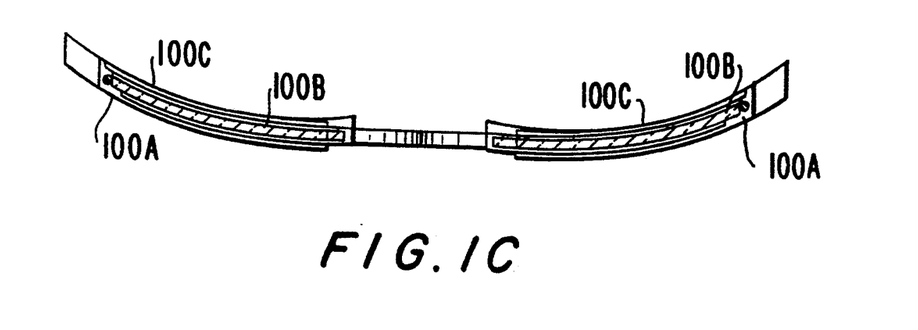
FIG. 1C shows a cross-section along line C—C' of FIG. 1A.
Figure 2A:
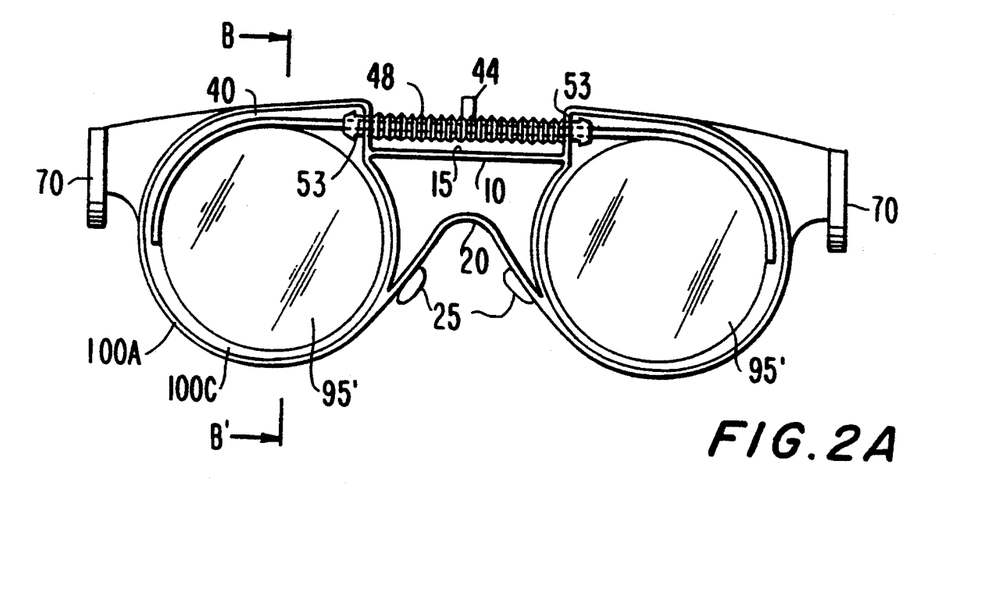
FIG. 2A shows a rear view of an embodiment of a variable density ophthalmic device of the invention.
Figure 2B:
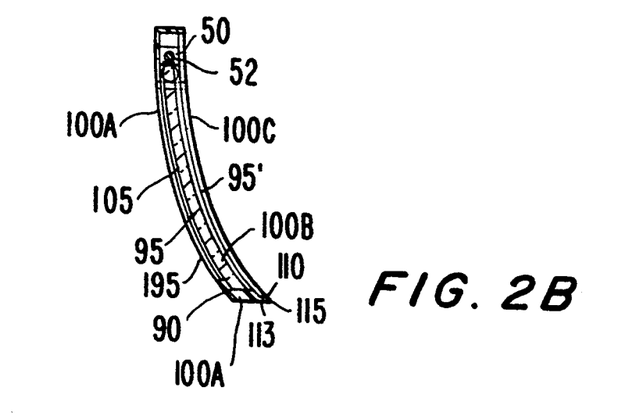
FIG. 2B shows a cross-section along line B—B' of FIG. 2A.
Figure 2C:
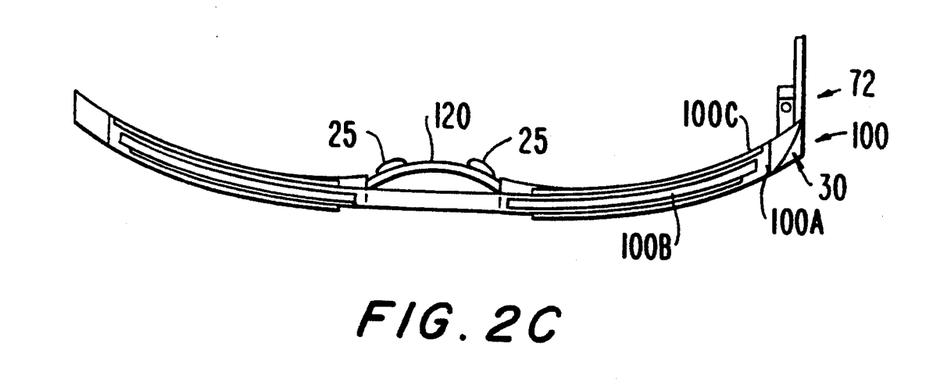
FIG. 2C shows a top view of the embodiment of FIG. 2A.
Figure 2D:
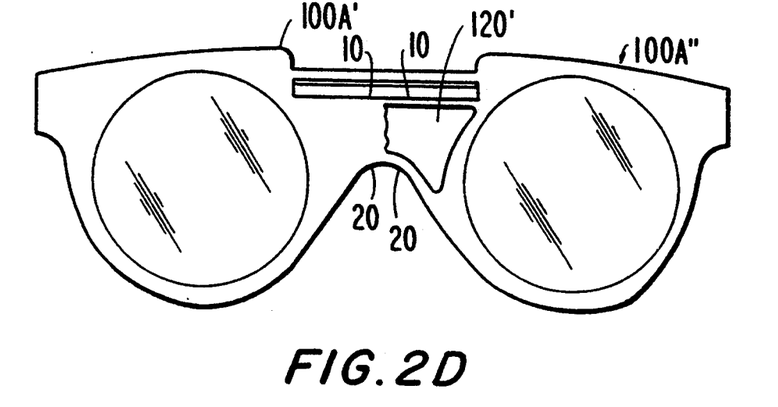
FIG. 2D shows a front view of a variable density ophthalmic device of the invention.
Figure 2E:
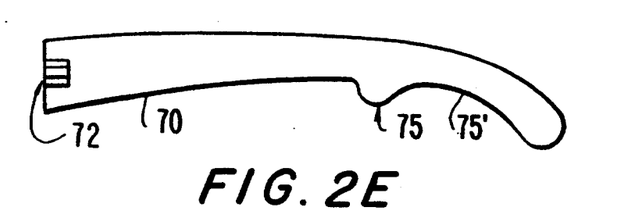
FIG. 2E shows a temple piece of a variable density ophthalmic device of the invention.
Figures 2F, 2G, 2H:
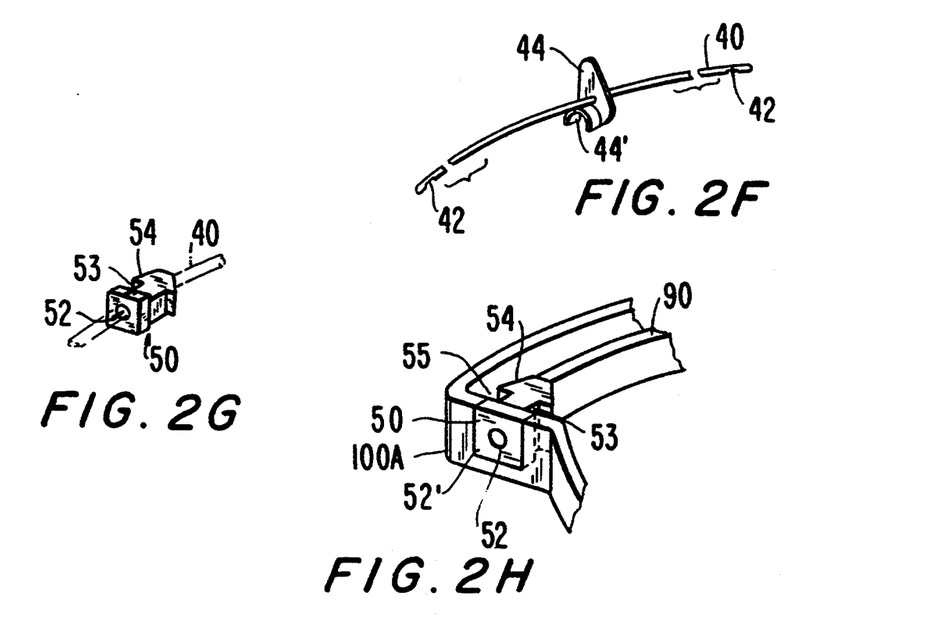
FIG. 2F shows a cable mechanism of a variable density ophthalmic device of the invention.
FIG. 2G shows a grommet detail of a variable density ophthalmic device of the invention.
FIG. 2H shows the grommet of FIG. 2G in place in a variable density ophthalmic device of the invention.

Considering FIGS. 2A, 2C, 2F, 2G, 2H, 3 and 3A in more detail, grommets 50 preferably matingly fit in grommet receiving means 55. As shown in FIGS. 2G and 2H, grommets 50 preferably have a cut-out 53 and trapezoidal head 54; and, grommet receiving means 55 is a female member substantially corresponding in shape to that of each of grommets 50. Cable 40 has knob 44 so that when in place in sunglasses 100, the user can move lenses 100B and thereby vary the density (or change the tint or color) of the sunglasses by moving knob 44 to the left or right. Knob 44, when in place, is located between the grommets 50, at the top of sunglasses 100 or 100' such that the use reaches to the bridge of the sunglasses to operate knob 44. Optionally knob 44 has cutout 44' which allows knob 44 to ride on upper surface 15 of upper bridge 10.

Cable 40 is made of any material which will slidably pass through but be sealable with hole 52 of grommet 50 without excess friction; and, grommet 50 is made of any suitable material which can be affixed into front frame component 100A and through which cable 40 can slidably but sealably pass through hole 52. Cable 40 can be made of polytetrafluoroethylene or polymers or co-polymers thereof, e.g., Teflon, and grommet 50 can be made of hard rubber or a hard plastic or nylon. Thus, grommet 50 acts as a gasket. Holes 52 can be slightly smaller than the diameter of cable 40 so that cable 40 can seal hole 52; but, the difference in diameter between hole 52 and cable 40 should not be so great as to cause so much friction that cannot be overcome by the lubricating quality of the material of cable 40, e.g., Teflon.

Looking down at sunglasses 100 in top view FIG. 2C, portion 120 is the view of upper bridge 10 and lower bridge 20 of FIGS. 2A. FIGS. 2A and 2C also show nose-rests 25 which are provided in a preferred embodiment in the curve between the lenses of sunglasses 100 or 100'.

Figure 4:
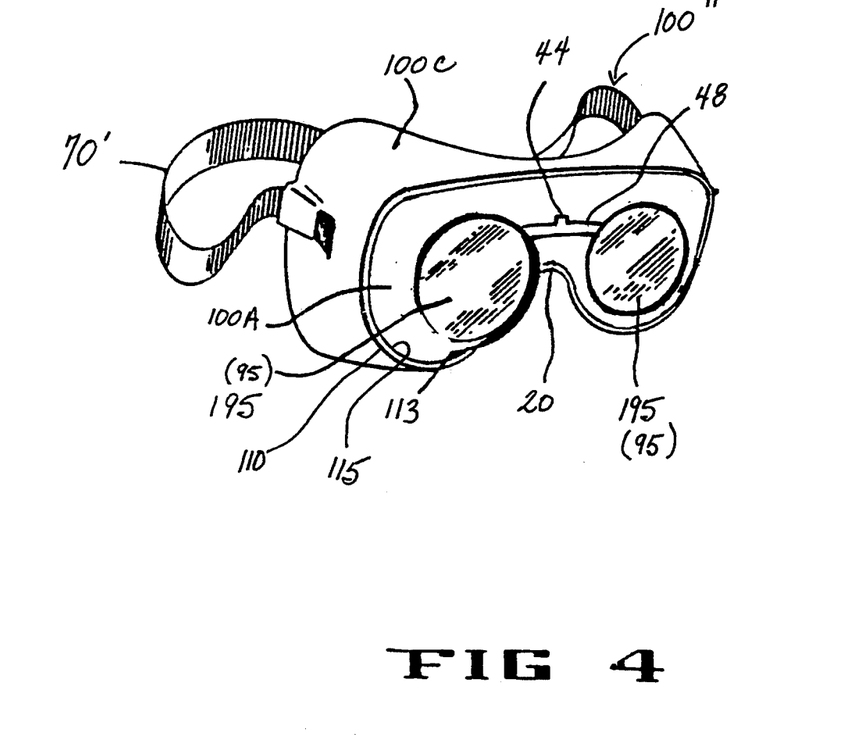
FIG. 4 shows a perspective view of goggles of the invention.

In FIG. 2C, line 30 at the top outer edge of front frame component 100A is where front frame component 100A can be angled back for its connection to temple pieces 70 (FIG. 2E) via toggle snap 72. That is, toggle snap 72 is located at the top outer edge of front frame component 100A as it is the connection between front frame component 100A and temple pieces 70. Temple pieces 70 (FIG. 2E) preferably have skeg fin 75 for providing contour surface 75' at the end opposite connection to front frame component 100A for fit behind the wearer's ear. Temple pieces 70 and toggle snap 72 can be formed from any suitable material such as plastic, e.g., polycarbonate. However, as shown in FIG. 4, rear frame component 100C can be contoured to fit against the wearer's face, and frame component 100A or 100C can connect to an elastic strap 70' to hold the sunglasses in place such that sunglasses 100 can be in the form of goggles such as ski goggles 100".

In FIG. 2A, over cable 40 is provided boot 48. Boot 48 can be a protective flexible sheath, made of rubber or any suitable flexible or elastomeric material, which preferably has desired barrier properties. Boot 48 can provide additional protection against moisture, dirt, etc. contacting lenses 100B via cable 40. Boot 48 can be two boots, each running from each grommet 50 to knob 44; or, one unit covering cable 40 entirely, spanning one grommet 50 to the other grommet 50. Boot 48 can be sealed to grommet 50 at outer surface 52' of grommet 50. Alternatively, boot 48 can run to cut out 53; i.e., boot 48 can be secured by grommet 50 in grommet receiving means 55 so as to seal cable 40 from right cut-out 53 to left cut-out 53. Boot 48 acts as a flexible sheath and could be secured to the inner surface of grommet receiving means 55, allowing for the omission of grommets 50.

The front views in FIG. 2D provide on the left side 100A and on the right side 100A'. The difference between 100A and 100A' is that right side 100A' shows that as an option in certain embodiments portion 120' between upper bridge 10 and lower bridge 20 can be cut out for aesthetic purposes, as well as for reduced weight.

Considering further FIGS. 1A, 1B, 1C, 2A, 2B, 3 and 3A, front frame component 100A can be formed of any suitable material which can be sealed to rear frame component 100C. In a preferred embodiment, frame components 100A and 100C are both plastic and are sealed to each other at the contact of surfaces 110 and 115 by sonic welding; with the weld line defined by these sealed surfaces indicated by seal line 113. More particularly, front frame component 100A and/or rear frame component 100C can be made from polycarbonate or any other suitable material.

Outside of the area of the lenses (lense area 195 of front frame component 100A and area 95' of rear frame component 100C), frame components 100A and 100C can be any suitable color. In a simple embodiment, lenses 95 (see FIG. 3) are an integral part of front frame component 100A (at area 195). Front frame component 100A can be substantially clear or transparent or non-polarizing at area 195 (with lenses 95 as an integral part of front frame component 100A, i.e., front frame component 100A can be molded or otherwise formed with lenses 95 or lenses 95 can be attached, e.g., welded, into openings in front frame component 100A so that lenses 95 are integral therewith). Lenses 100B can be polarized or retarder lenses; and, rear frame component 100C can be formed from a polarizing material. That is, rear frame lenses 95' of rear frame component 100C can also be integral with rear frame component 100C and are stationary polarizing lenses; and, lenses 100B are rotatable polarized or retarder lenses. And again, it is noted that "integral" means that the frame component is molded or otherwise formed with the lenses as a part of it or the lenses are attached, e.g., welded, into openings in the frame component.

Of course, lenses 95 (FIG. 3A) can be non-integral with front frame component 100A, but set in a stationary position in front frame component 100A, between lenses 100B and the inner surface 105 of front frame component 100A (at lense area 195). For instance, in front of track 90 and to inner surface 105, lenses 95 can be affixed, for example, by any suitable adhesive. Alternatively, an additional track (not shown) can be in front of track 90 whereat lenses 95 are set in a stationary position. Of course, lenses 95 can be held in place to inner surface 105 by tabs (not shown). In this instance lenses 95 can be polarizing lenses with lenses 100B being rotatable polarizing or retarder lenses and rear lenses 95' of rear frame component 100C being either substantially clear or nonpolarizing or polarizing lenses. Likewise, front frame component 100A, either entirely or at lense area 195 (in front of or at lenses 95) can be formed of a polarizing material, lenses 95 can be stationary retarder lenses, lenses 100B can be rotatable polarizing lenses and rear lenses 95' of rear frame component 100C can be formed of a nonpolarizing material. For ease in considering these and other permutations, they are set out below in Table I. Each lense is preferably about 0.030 to about 0.040 inches thick. Thus, front frame component 100A at lense area 195 (lenses 95) is also about 0.030 to about 0.040 inches thick, with rear lenses 95' of rear frame component 100C being of about the same thickness. Since rear frame component 100C matingly fits within front frame component 100A, front frame component 100A (and sunglasses 100 or 100') has a thickness of about 0.090 to 0.160 inches, preferably about 0.120 to about 0.130 inches, most preferably about 0.120 to about 0.125 inches.

In addition, as a further variation, the retarder need not be a separate lense from the polarizing lense. Rather, the retarder can be directly coated onto the polarizing lense, e.g., coextruded or laminated to the polarizing lense, e.g., lenses 100B (such that front frame component 100A at lense area 195 (lenses 95) and rear lenses 95' can be clear or non-polarizing). Laminating is preferred. In this instance the retarder can be as thin as a typical film such as clear adhesive tape, e.g., cellophane tape or "Scotch Magic Tape"; for instance about 0.001 to about 0.005, preferably about 0.0015 to about 0.0025 inches, more preferably about 0.002 inches. Likewise, the retarder can alternatively be coated, e.g., laminated, to a surface of lenses 95 or 95'. Suitable materials for the retarder coating (preferably laminated retarder) include any suitable materials which are polarization form converters such as polyvinyl alcohol, e.g., oriented polyvinyl alcohol on a cellulose acetate butyrate substrate, polystyrene, cellophane, cellulose acetate butyrate or the like. Further, any or all of the lenses can be coated with a UV absorber so as to provide UV protection to the wearer, as well as prevent UV absorption by the materials comprising the sunglasses of the invention.

TABLE I

| 100A/195 | 95 | 100B | 100C |
| --- | --- | --- | --- |
| C | NP | P/R | P |
| C | P | P/R | C |
| C | P | P/R | P |
| P | R | P | C |
| P | NP | P/R | P |
| P | NP | P/R | C |

C = Non-polarizing
NP = not present or integral part of front frame component 100A
P/R = polarizer or retarder
P = polarizer
100A/195 = front frame component 100A either entirely or in lense area 195 (or at lenses 95 when lenses 95 are integral part of front frame component 100A)
95 = lenses 95 (either when integral with front frame component 100A, or when separate lenses therefrom)
100B = lenses 100B
100C = rear frame component 100C, either entirely or in area 95'

Figure 5:
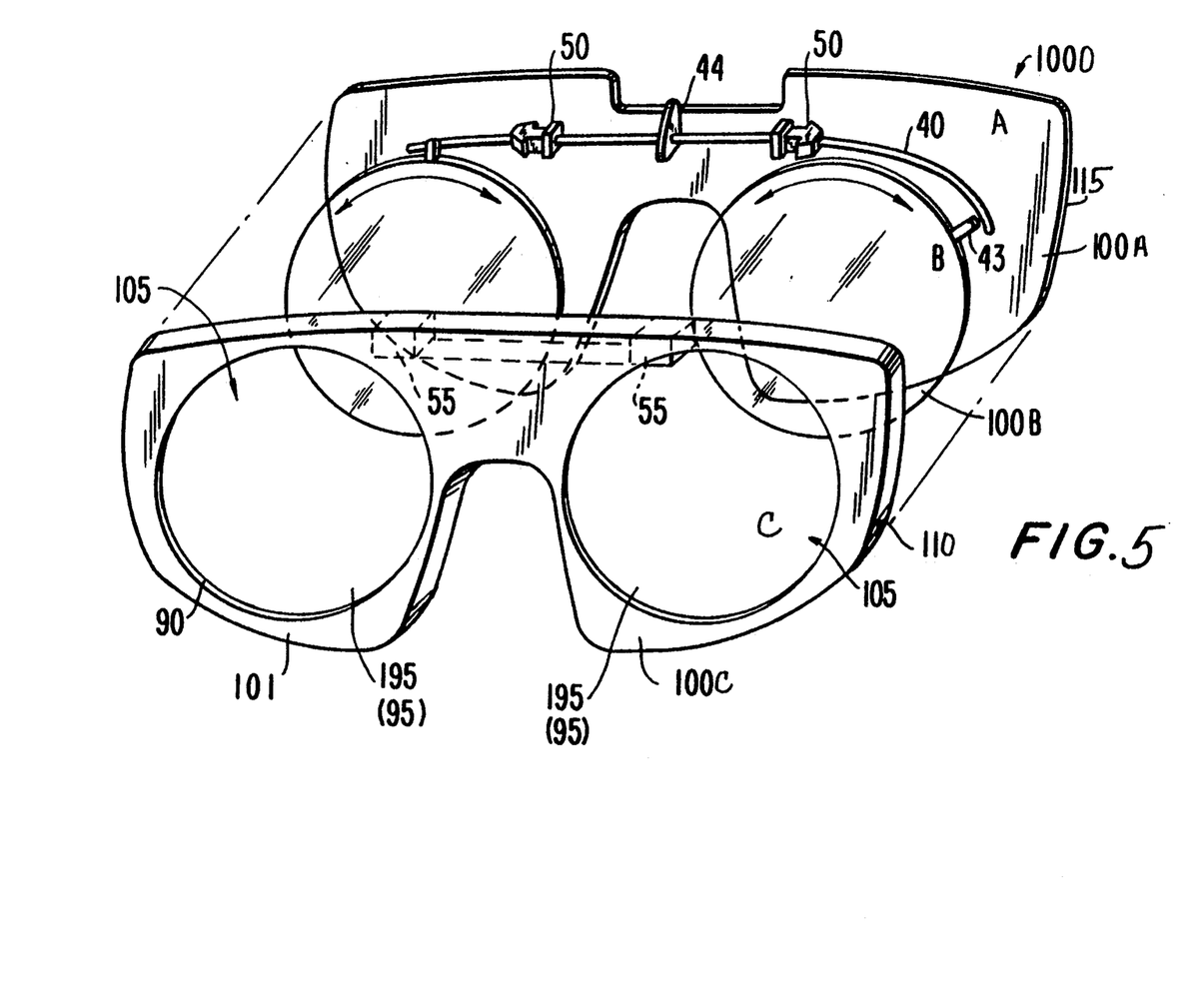
FIGS. 5 and 5A show exploded views of variable density ophthalmic devices of the invention.
Figure 5A:
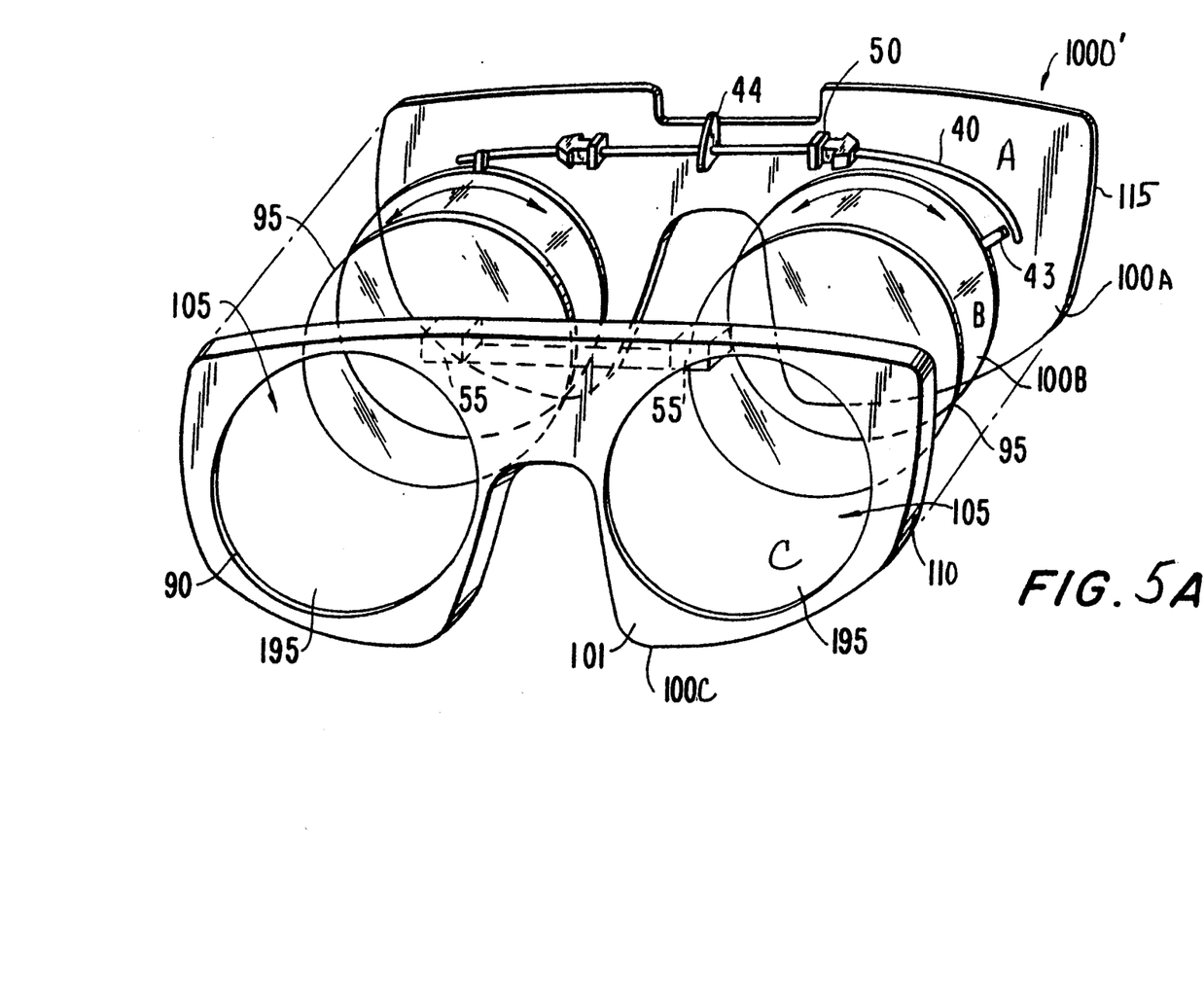

As can be understood from the above description of the lenses and frame components, lenses 95 and lense area 195 can be one in the same and part of front frame component 100A. Front surface 101 of front frame component 100A can be substantially uniform over its entirety, including at lense area 195, so that an observer viewing sunglasses 100 or 100' does not necessarily distinguish a circular lense area from the front of front frame component 100A. Additional lenses, in addition to those illustrated, such as additional stationary or rotatable lenses can be positioned in either of frame components 100A and/or 100B. Any pair of lenses in the ophthalmic device can be prescription lenses to correct vision. The preferred thicknesses set out above are so that the sunglasses 100 or 100' do not have a thick or "coke-bottle" appearance and are thus aesthetically pleasing and/or fashionable. And, as shown in FIGS. 5 and 5A (sunglasses 1000 and 1000'), the structures of front frame component 100A can be contained within rear frame component 100C with front frame 100A then matingly fitting within and sealing to frame component 100C.

That is, rather than front frame component 100A containing the rotatable lenses 100B, grommet receiving means 55, cable 40 and grommets 50, the rear frame component 100C can be configured to contain rotatable lenses 100B, grommet receiving means 55, cable 40 and grommets 50, as well as optional additional lenses 95; and, front frame component 100A, in this instance, then matingly fits within and seals to frame component 100C. Thus, it is a concept of the invention to seal the movable lenses between mating front and rear frame components.

Any suitable polarizers and retarders can be employed in the practice of this invention. Commercially available polarizers for use as polarizing lenses in the invention include Polaroid brand polarizers, such as Polaroid polarizers, HNCP10, HNCP22, HNCP37, HACP, HBCP, HGCP, HRCP, HRCP, HN42HE, HN22, HN32, HN38, HN3BS, HN42, HR and HNPB. Presently preferred polarizers include HN42HE, HN38 and HR. Retarders are polarization form converters. Polaroid retarders are clear, oriented polyvinyl alcohol film laminated to a cellulose acetate butyrate substrate. It has also been observed that commercially available sheet polystyrene can perform as a retarder. Note that unless otherwise specified, particularly in the appended claims hereto, the term "polarizing lens" includes a retarder lense.

A pair of lenses or a plurality of pairs of lenses in the ophthalmic device of the invention can also provide UV protection, e.g., cosmetic UV protection (block at least 70% UVB, at least 20% UVA and less than 60% visible light), general purpose UV protection (block at least 90% UVB, at least 60% UVA and 60 to 92% visible light) or special purpose UV protection (block at least 99% UVB, at least 60% UVA and 20 to 97% visible light). A preferred UV protection is blocking of 99% UVB and 90% or more UVA. UV protection is especially a consideration during midday or at the beach, on the water, or the snow, or other times or places when or where glare can be intense.

The components of sunglasses 100 or 100' can be manufactured by any suitable process. For instance, frame components 100A and 100B can be molded products and lenses such as lenses 95 and 100B can be formed from sheets or cast or molded into a suitable lense shape. Frame components 100A and 100C can be affixed to each other by any suitable means, such as by way of any suitable adhesive; however, sonic welding is presently preferred since this process can be automated, mechanized, and, provide a clean connection between the frame components. Likewise, grommets 50 can be set in grommet receiving means via any suitable adhesive or sonic welding. In the manufacture of sunglasses 100 or 100' it is preferred that the assembly and sealing of the components thereof be done in a relatively dust-free, relatively low relative humidity environment so as to prevent excessive dust or humidity (moisture) from being sealed between frame components 100A and 100C. This is a particular consideration, especially with respect to assembly in a relatively low relative humidity environment, when it is desired that sunglasses 100 or 100' be substantially anti-fog, since excessive moisture between frame components 100A and 100C can, in colder temperatures, cause the sunglasses to fog. Of course, the outer surfaces of sunglasses 100 or 100' can also be coated, for instance with a mild wax or wax-like polymer, which can assist in preventing fogging of these outer surfaces.

While the invention has been described with reference to the illustrated embodiments, the concept of a sealed variable density opthalmic device of this invention can be achieved using gears to move the rotable lenses. For instance, the devices of Eloranta, U.S. Pat. No. 2,565,362, Ogle, U.S. Pat. No. 4,595,262, and Tillyer et al., U.S. Pat. No. 2,380,481 (each incorporated herein by reference) can be modified in accordance with this invention. For instance, the gear mechanisms of these prior devices can be sealed in a frame component of this invention, with the operating knob including a gasket or other sealing means protruding through an opening so as to prevent moisture from penetrating into the sunglasses. Thus, the invention broadly comprehends any means for moving the rotatable lenses which are sealed between front and rear frame components, including operating means for the user to rotate the lenses and sealing means.

Having thus described in detail preferred embodiments of the present invention, it is to be understood that the invention defined by the appended claims is not necessarily limited to the preferred embodiments as many apparent variations thereof are possible without departing from the spirit or scope of the invention.

What is claimed is:

1. A variable density ophthalmic device comprising:
a frame provided with a bridge portion connecting right and left frame sections each supporting at least one rotatable polarizing lense, said frame further comprising:
a rear frame component having a bridge portion connecting right and left sections each supporting the rotatable polarizing lense;
means defining at least one opening in the rear frame component;
means for moving the rotatable lenses, including operating means and sealing means at the opening; and
a front frame component having a bridge portion connecting right and left sections, wherein the improvement comprises said front frame component matingly fitting and substantially hermetically sealed to said rear frame component;
so that by said sealing means and said front frame component being substantially hermetically sealed to said rear frame component, said variable density ophthalmic device is substantially sealed, substantially liquid-proof and has a substantially moisture-free atmosphere between the front and rear frame components.

2. The variable density ophthalmic device of claim 1 wherein the means defining at least one opening is means defining an opening at the right and left sections of the rear frame component and the means for moving the rotatable lense comprises:
a thin strip of flexible material slidably extending laterally across a top portion of the rear frame component, the length of said strip being greater than the distance between the axes of said rotatable lenses, and said strip having a first end and a second end said first end passing through one opening of the rear frame component and being connected to one rotatable polarizing lense, and said second end passing through the other opening of the rear frame component and being connected to the other rotatable polarizing lense;

an operating knob protruding from said strip for movement of said strip so as to simultaneously adjust the angular position of the rotatable lenses; and means to substantially hermetically seal the opening at the right and left sections of the rear frame component and that portion thereof through which the strip passes through.

3. A variable density ophthalmic device comprising:

a frame provided with a bridge portion connecting right and left frame sections each supporting at least one rotatable polarizing lense, said frame further comprising:

a front frame component having a bridge portion connecting right and left sections each supporting the rotatable polarizing lense;

means defining at least one opening in the front frame component;

means for moving the rotatable lenses, including operating means and sealing means at the opening; and a rear frame component having a bridge portion connecting right and left sections, wherein the improvement comprises said rear frame matingly fitting and substantially hermetically sealed to said front frame component;

so that by said sealing means and said rear frame component being substantially hermetically sealed to said front frame component, said variable density ophthalmic device is substantially sealed, substantially liquid-proof and has a substantially moisture-free atmosphere between the front and rear frames components.

4. The variable density opthedmic device of claim 3 wherein the means defining at least one opening is means defining an opening at the right and left sections of the front frame component and the means for moving the rotatable lenses comprises:

a thin strip of flexible material slidably extending laterally across a top portion of the front frame component, the length of said strip being greater than the distance between the axes of said rotatable lenses, and said strip having a first end and a second end, said first end passing through one opening of the front frame component and being connected to one rotatable polarizing lense, and said second end passing through the other opening of the front frame component and being connected to the other rotatable polarizing lense;

an operating knob protruding from said strip for movement of said strip so as to simultaneously adjust the angular position of both of the rotatable lenses; and means to substantially hermetically seal the opening at the right and left sections of the front frame component and that portion thereof through which the strip passes through.

5. The variable density ophthalmic device of claim 4 wherein the means to substantially hermetically seal the opening comprises a gasket fitting in each opening of the front frame component, said gasket having a means defining an opening of a first diameter, and said strip having a second diameter slightly larger than said first diameter.

6. The variable density ophthalmic device of claim 4 wherein each of the front frame component and rear frame component is comprised of plastic, and the rear frame component is sonically welded to the front frame component.

7. The variable density ophthalmic device of claim 4 wherein the means to substantially hermetically seal the opening comprises a flexible sheath fitting in each opening of the front frame component, said sheath having a first end, a second end, length and a means defining an opening of a first diameter at said first and second end, said strip having a second diameter slightly larger than the first diameter, and said length extending from said opening to about said knob.

8. The variable density ophthalmic device of claim 5 wherein the means to substantially seal the opening comprises a flexible sheath fitting in each opening of the front frame component, secured therein by the gasket, said sheath extending from each opening over the knob.

9. The variable density ophthalmic device of claim 4 wherein the rear frame component includes a polarizing lense in each of the right and left sections.

10. The variable density ophthalmic device of claim 4 wherein the front frame component includes a fixed polarizing lense in each of the right and left sections.

11. The variable density ophthalmic device of claim 4 further comprising a guide seat on the bridge portion upon which the strip rides.

12. The variable density ophthalmic device of claim 5 further comprising rearwardly extending temple pieces from the frame whereby said device is sunglasses.

13. The variable density sunglasses of claim 5 further comprising at least one rearwardly extending strap from the frame whereby said device is goggles.

14. The variable density ophthalmic device of claim 4 wherein between the rear frame component and the front frame component is a controlled atmosphere so that said variable density ophthalmic device is substantially anti-fog.

15. The variable density ophthalmic device of claim 4 where each of the front frame component and rear frame component is of a material such that the variable density ophthalmic device is substantially buoyant.

16. The variable density ophthalmic device of claim 15 wherein the material of at least the front frame component is polycarbonate.

17. The variable density ophthalmic device of claim 1 wherein the strip is comprised of polytetrufluoroethylene, or polymers or copolymers thereof.

18. The variable density ophthalmic device of claim 8 wherein the strip is comprised of polytetrufluoroethylene, or polymers or copolymers thereof.

19. The variable density ophthalmic device of claim 4 wherein the rear frame component includes a polarizing lense in each of the right and left sections and the front frame component includes a fixed polarizing lense in each of the right and left sections.

* * * * *